United States Patent [19]

Higginbotham

[11] 4,011,206

[45] Mar. 8, 1977

[54] EXTRACTION OF A SWEET SUBSTANCE FROM *THAUMATOCOCCUS DANIELLII* FRUIT

[75] Inventor: John Douglas Higginbotham, near Reading, England

[73] Assignee: Tate & Lyle Limited, London, England

[22] Filed: Apr. 28, 1976

[21] Appl. No.: 681,258

[30] Foreign Application Priority Data

Apr. 29, 1975 United Kingdom ............ 17831/75
Feb. 13, 1976 United Kingdom ............ 5719/76

[52] U.S. Cl. .......................... 260/112 R; 426/548; 426/656
[51] Int. Cl.$^2$ ..................... A23J 1/00; A23L 1/22; C07G 7/00
[58] Field of Search .................... 426/548, 656; 260/112 R

[56] References Cited

UNITED STATES PATENTS 3,878,184  4/1975  Dobry ............................. 426/548
3,934,047  1/1976  Schade ........................... 426/548

OTHER PUBLICATIONS

Chemical Abstracts, 78:40390u (1973).
Chemical Abstracts, 79:62804e (1973).
Chemical Abstracts, 80:78797m (1974).
Chemical Abstracts, 82:168876g (1975).

*Primary Examiner*—Morris O. Wolk
*Assistant Examiner*—Sidney Marantz
*Attorney, Agent, or Firm*—Ostrolenk, Faber, Gerb & Soffen

[57] ABSTRACT

A sweet substance is obtained from the fruit of *Thaumatococcus daniellii* by extraction with an aqueous aluminum salt. The extract is purified by ion-exchange techniques and ultra-filtration. The substance extracted is an aluminum adduct of thaumatin. The extract is sweeter and more stable than other aqueous extracts and swelling of the fruit is minimized.

22 Claims, No Drawings

EXTRACTION OF A SWEET SUBSTANCE FROM *THAUMATOCOCCUS DANIELLII* FRUIT

The present invention relates to a sweet substance, its preparation and its use as a sweetener for edible material.

Although sucrose is still the most widely used sweetening agent, synthetic sweeteners have become increasingly important in recent years.

Saccharin is an example of a commonly used synthetic sweetener. Saccharin and its salts are widely used as a substitute for sugar, but have the disadvantage of having a bitter and metallic after-taste. Cyclamates have also been proposed for use in sweetening compositions, but some concern has been expressed as to their toxicity, and their use has been restricted or banned in some countries.

Considerable interest has been shown in other naturally occurring sweet substances to replace, or augment, the sweetness of sucrose.

A sweet principle (known as "Thaumatin") occurs in the fruit of the tropical plant *Thaumatococcus daniellii* Benth. of the family Marantacea, which grows in tropical regions, especially in parts of tropical Africa. The plant is known as Katemfe in Sierra Leone. It is tetrahedral, approximately 4 cm diameter and contains up to three large black seeds each having a white or light yellow aril at its apex and surrounded by a transparent jelly. The arils are intensely sweet. Thaumatin can be obtained from the arils or fruit containing them by aqueous extraction procedures, e.g. those described by van der Wel and Loeve in Eur. J. Biochem., 31, 221–5 (1972).

This sweet substance can be obtained from the fruit as an aqueous extract which may if desired, be freeze-dried to give a solid product. The simplest extraction procedure is extraction of the ruptured fruit with water followed, if desired, by purification techniques such as ion exchange or ultra-filtration.

While the efficiency of the extraction procedure can be increased by the use of dilute aqueous solutions of common salt (sodium chloride), it has now been found, surprisingly, that extraction with an aluminum salt affords several advantages not encountered using other salts.

According to a feature of the present invention, a process is provided for the extraction of a sweet substance from the fruit of *Thaumatococcus daniellii* which comprises extracting the fruit or a portion thereof with a dilute aqueous solution of an aluminum salt.

It has been found that the process according to the present invention has the following advantages.

The substance which surrounds the seed is a gel which has remarkable water-absorption properties. When it comes in contact with water, it swells and will absorb up to 15 times its own weight of water. This gel-swelling causes problems in the extraction in that it absorbs both sweetener and extractant. The use of sodium chloride inhibits the gel-swelling to a certain extent, but it has been found that the use of aluminum salts can provide, on a molar basis, about 30 times the gel-swelling inhibition obtained with sodium chloride.

The inhibition of gel-swelling is proportional to the concentration of salt used. The notable inhibition of gel-swelling provided by aluminum salts increases the effficacy and ease of extraction of thaumatin markedly.

A second advantage is the improved colour of the extract. Extracts obtained using water or aqueous sodium chloride are usually brown in colour and this colour is retained and concentrated during ultra-filtration and is retained in the freeze-dried product. In contrast, the extract obtained using an aluminum salt is light yellow. In a typical example, the sodium chloride extract had an optical density at 558 nm of 1.7 times the optical density of the corresponding aluminum salt extract. Furthermore, the pale yellow colour permeates the membrane on ultra-filtration, yielding an even paler product.

A third advantage in the use of aluminum salts is in the clarification of the extraction liquors. Aqueous extracts obtained after stirring and then draining off the crushed fruit are turbid. Extracts using aluminum salts however clarify more rapidly than other extracts to give clear liquors without the need for centrifugation prior to ultra-filtration. Furthermore, the permeation rates in ultra-filtration are higher as there are less small particles to clog the membranes.

A fourth advantage is the fact that aluminum salts are more "selective" in the material extracted. In a typical aqueous extraction, analysis by gel chromatography in which the compounds of the extract are separated according to molecular weight, indicates three major fractions: an initial large molecular weight (ca. 40,000) non-sweet peak followed by the sweet substance (ca. 20,000) and smaller molecular weight (ca. 2,000) non-sweet substances. In contrast, using an aluminum salt in the extract yields relatively more of the sweet fraction and less of the first fraction.

The selectivity is also illustrated if an extract obtained using water or aqueous sodium chloride is dissolved in a solution of an aluminum salt. In this case, much of the non-sweet material and coloured matter is precipitated giving a much purer product in solution.

A fifth advantage of the present process is the fact that the extract obtained is stable for prolonged periods, whereas sodium chloride or water extracts gradually lose their sweetness over a period. The stability is maintained at room temperature, 4° C or at 37° C. Furthermore, sodium chloride and water extracts tend to putrefy rapidly while aluminum salt extracts remain "fruity-sweet" smelling, with inhibited microbiological growth.

A sixth advantage of the process is the enhanced stability to heat of extracts using aluminum salts. If a conventional extract using water or an alkaline metal salt is heated, the sweetness is destroyed. In contrast, after heating at 100° C for 13 minutes an aluminum salt extract was still sweet when cool.

Finally, a seventh advantage of using aluminum salts in the extraction of thaumatin is the fact that the extract obtained is sweeter than that obtained using water or sodium chloride solutions. Typically, the aluminum salt extract obtained is 1.5 to 2 times as sweet as the extract obtained using sodium chloride.

For economy, reasonable yields and sweetness of extract, the concentration of the aluminum salt used is preferably not greater than 2% and is advantageously in the range 0.7 to 1% by weight. The temperature of the extraction may be ambient temperature or a slightly elevated or reduced temperature, e.g. a temperature in the range 4° to 40° C. Optimal yields and economy are afforded by extraction at ambient temperature.

The inhibition of gel-swelling is enhanced by maintaining the pH of the extract relatively low, a practice which also minimises discoloration. In practice, a pH of around 3.6 is afforded by an aluminum salt such as aluminum sulphate whereas sodium chloride extracts exhibit a pH of around 5.6.

Apart from the advantages obtained by using an aluminum salt in the extraction process as detailed above, it has been found, most surprisingly, that the extract obtained contains an aluminum thaumatin adduct: that is to say, the thaumatin contains bound aluminum. Extracts made using sodium chloride or other salts naturally contain metal ions but these can be virtually completely removed from the extract by dialysis. It has been found that even after exhaustive dialysis against deionised water, aluminum salt extracts contain some unremoved aluminum, apparently bound to the protein material, i.e. to the thaumatin itself. While it is not wished to be bound by theory, it is probable that the increase in sweetness obtained using an aluminum salt as extractant is due to the formation of the adduct, which in some way protects the thaumatin molecule from degradation.

This aluminum adduct can be purified by dialysis, ultra-filtration, etc., and can be freeze-dried to give a solid product which is sweeter than the product obtained by water or sodium chloride extraction. This aluminum adduct is a novel substance and constitutes a further feature of the present invention. It may be formed by contacting thaumatin with aluminum ions.

Formation of the aluminum adduct on contact with aluminum ions means that aluminum salt may also be used to purify an existing aqueous or sodium chloride extract. As indicated above, a freeze-dried extract can be dissolved in a solution of an aluminum salt, thereby precipitating unwanted compounds. Alternatively, an aqueous extract can be dialysed against an aluminum salt solution, whereupon the sweet substance forms the aluminum adduct. Thus according to the present invention, the adduct can be formed by contacting thaumatin with aluminum ions, e.g. by an extraction process as described above or by dialysis of an aqueous extract against an aqueous solution of an aluminum salt.

We have found that any aluminum salt is suitable for extraction or other treatment. Particularly preferred salts, however, are salts with sulphuric acid, such as compound salts with alkali metals or ammonia, but most preferably aluminum sulphate itself. Typical salts which we have found effective thus include aluminum sulphate hexadecahydrate, aluminum potassium sulphate dodecahydrate and aluminum ammonium sulphate dodecahydrate. Aluminum chloride hexahydrate is also useful.

The extraction of thaumatin may be effected using the whole fruit of *Thaumatococcus daniellii*, ruptured so as to expose the arils but without breaking the seeds. Alternatively, isolated arils can be extracted.

It has also been found that solutions of the sweetener can be purified further by ion exchange using a cationic ion-exchange medium, in particular a carboxylic or sulphonic resin or cellulose.

The carboxymethylcellulose range of cation exchange media are suitable for the purpose, for example, the Whatman CM series (CM 22, 23, 32, 52) or the Sephadex carboxymethyl media. However, the most advantageous medium is a sulphonic acid cross-linked dextran, in particular a sulphopropyl resin such as Sephadex SP C25 and SP C50. This SP C50 is the best found for the purpose, having a smaller degree of cross-linking that the C 25 and hence a larger pore size. SP C50 has a capacity of up to 4 g thaumatin per gram of dry resin, depending on the $Al^{3+}$ content of the sweetener. Naturally, free aluminum cations in the extract compete for available sites on the resin.

Sulphopropyl resins of this type swell markedly in water. SP C50 resin swells to a volume of about 60 ml per gram in water, but shrinks to about ⅓ of this volume when the thaumatin extract is applied. This swelling and shrinkage can cause handling problems, but these are offset by the considerable capacity. SP C25 resin swells and shrinks less but has only about 15% of the capacity of SP C50.

These media can be used in the free $H^+$ form or in the form of a salt with an alkali metal or ammonia, preferably sodium or potassium. The salt is preferred as the $H^+$ form has a lower capacity and also can cause degradation of the thaumatin in the low pH environment locally occurring.

The loading of the resin or cellulose is conveniently effected by percolating the filtered thaumatin extract through a packed column or by adding volumes of extract bacthwise, stirring with the outlet closed, leaving the mixture to stand, and then draining off the liquid. The latter method is much quicker but slightly less efficient. Thaumatin is adsorbed and water, salts, non-sweet proteins, peptides and polysaccharides and coloured matter are passed through. The fully loaded resin is desirably then washed copiously with water (demineralised) to elute weakly adsorbed extract components, e.g. using about 8 shrunken bed volumes.

The degree of adsorption of the thaumatin is strongly dependent on pH, the optimum pH being about 3.5–4.0. This is particularly convenient since the natural pH of the extract is about 3.8, and thus no pH adjustment is necessary.

Colour and then sweetener can be elued using an aqueous solution of an alkali metal or ammonium salt of an acid, especially a carboxylic acid, in particular an α-hydroxy mono-, di- or tricarboxylic acid such as citric, tartaric, malic or lactic acid. Lactates are preferred for colour removal, while citrates are superior for sweetener elution. The sodium or potassium salt is most suitable, especially trisodium citrate and sodium lactate.

A very dilute solution of the salt, e.g. 0.01 to 0.05 M sodium lactate, elutes most of the bound colour. Thus the brown resin becomes pink. At stronger concentrations, the sweetener itself is eluted, e.g. 0.025 to 0.05 M trisodium citrate. The sodium salts of tartaric, lactic and malic acid can also be used to elute sweetener but are only 37%, 14% and 15%, respectively, as efficient as equimolar citrate. Sodium chloride is not as effective, even at a concentration of 0.25 to 0.5 M. The use of a salt has the additional advantage that the resin is reconverted into the salt form.

The pH of the extract is advantageously controlled during the purification treatment. The alkali metal salts such as citrates, especially trisodium citrate, have a relatively high pH. For example 0.05 M trisodium citrate has a pH around 7. For subsequent ultra-filtration, however, it is desirable to lower the pH to 3 to 4.5, i.e. to liberate free citric acid, in order to obtain good separation.

The pH may be lowered simply by adding a mineral acid such as hydrochloric acid, under controlled conditions.

The control of the pH has an additional importance for the following reason.

When the extract is first loaded onto the ion-exchange column, free aluminum ions in solution become bound onto the ion-exchange medium from which they are subsequently eluted during the purification process. At a pH of around 7, especially using citrates, the aluminum bound to the thaumatin is removed, possibly by a sequestering effect, thus giving a substantially aluminum-free product.

However, if the pH is lowered to 3 to 4.5, the aluminum can recombine with the thaumatin, reforming the adduct. The product then is the adduct, containing aluminum and having the advantages of increased heat stability and sweetness. Thus it is possible to select an aluminum adduct or an aluminum-free product by choice of purification conditions.

The eluted thaumatin (either still containing bound aluminum or aluminum-free) may then be frozen in trays and freeze-dried.

Some colour remains bound on the resin even after complete removal of the sweetener. This colour can be removed and the resin completely regenerated by elution with dilute sodium or other alkali metal or ammonium hydroxide (e.g. 0.01 to 0.05 M) and water washing.

The following Examples illustrate the invention; (all percentages are by weight):

EXAMPLE 1

Effect of salts on water absorption by *Thaumatococcus daniellii* (Td) gel in situ Td fruit was shelled and the seeds and arils with accompanying gel were allowed to swell for 24 hours at room temperature in 50 ml of the test salt solutions containing in addition 0.05% $Na_2S_2O_5$ and benzoic acid as preservatives. The results obtained are shown in Table 1.

Table 1

| Salt | Molarity | ml Water uptake per g. seed | % Inhibition |
|---|---|---|---|
| NaCl (1%) | 0.171 | 2.80 | 45 |
| $Al_2(SO_4)_3 16H_2O$ (0.7%) | 0.011 | 0.73 | 86 |
| $AlK(SO_4)_2 12H_2O$ (0.7%) | 0.015 | 1.35 | 74 |
| $AlNH_4(SO_4)_2 12H_2O$ (0.7%) | 0.015 | 1.22 | 76 |
| Control water | — | 5.1 | — |

EXAMPLE 2

Effect of salt concentration on Td extract yields

Seeds and arils were extracted using a number of different salts at concentrations of 0.1%, 0.5% and 1%. The yield is shown in Table 2 below:

Table 2

| Salt | Molarity of 1% | Yield/10Td seeds (mg) 0.1% | 0.5% | 1% |
|---|---|---|---|---|
| $H_2O$ | — | | (19.7) | |
| NaCl | 0.171 | | | 84 |
| $AlCl_3 6H_2O$ | 0.041 | | | 89 |
| $AlK(SO_4)_2 12H_2O$ | 0.021 | 10.5 | 63 | 110 |
| $AlNH_4(SO_4)_2 12H_2O$ | 0.021 | 31.5 | 73.5 | 105 |
| $Al_2(SO_4)_3 16H_2O$ | 0.016 | 52.5 | 147 | 199 |

EXAMPLE 3

Effect of temperature on extract yield

Three samples of each of 10 seeds of Td were extracted using 100 ml 0.7% aluminum sulphate solution. The results are shown in Table 3 below. The sweetness threshold is compared with sucrose.

Table 3

| Temperature | Yield | Sweetness Threshold as compared with 0.9% sucrose |
|---|---|---|
| 4° C | 158 mg | 2–300x |
| ambient | 195 mg | 3–400x |
| 37° C | 174 mg | 3–400x |

EXAMPLE 4

Extraction with aluminum sulphate 1 kg of Td fruit was well washed with water and then crushed between stainless stell rotors in order to split the skins without crushing the seeds. In the remainder of this description, the numerical values given indicate the range of figures obtained in a number of similar runs. The resultant pulp was extracted with 2–2½% liters of 0.7 to 1.0% aqueous aluminum sulphate with mechanical stirring for 30–60 minutes. The aluminum sulphate solution contained 0.05 to 0.1% sodium metabisulphite. A light yellow very sweet liquor was obtained which was drained off from the solid matter and filtered. The clarified liquor was then further purified either by ultra-filtration or by dialysis and then freeze-dried to give a light yellow-brown powder (2.0 to 3.0 g) having 3,000 to 4,000 times the sweetness of sucrose (measured at 10% sucrose level). The yield obtained amounts to a major proportion of the available sweetener in the fruit. Further extractions yield additional amounts. The extraction efficiency is improved by recycling.

In an alternative procedure, a stationary plug of fruit pulp is extracted by a rapid flow of extractant solution in a tube. The solution is recycled until maximum concentration of sweetener is obtained. In this procedure, it is desirable to rupture the aril membranes before extraction.

EXAMPLE 5

Crude thaumatin extract from about 225 kg fruit (about 100 liters) (obtained as described above, by extraction of the fruit with 600 liters of an aqueous aluminum salt and subjecting the extract to ultra-filtration) was loaded by batchwise stirring onto a 25 liter column containing 20 liters of swollen Sephadex SP C50 in the $Na^+$ form. The fully loaded resin was washed with at least 50 liters of demineralised water followed by 20 liters of 0.0275 M aqueous sodium lactate to remove colour. Thaumatin was then eluted with 25 to 35 liters 0.05 M trisodium citrate containing 500 ppm sodium metabisulphite as preservative. The pH of the eluate was adjusted to about 4 and it was ultrafiltered (to remove citrate etc), concentrated to 15 to 20 liters and freeze-dried, to give a purified solid product (250 g, 1.55 g/kg fruit) containing from 8 to 9% water; about 3% citrate; about 1% carbohydrate; 14 to 15% nitrogen; about 0.03% aluminum and less than 7.5% ash.

I claim:

1. A process for the extraction of a sweet substance from the fruit of *Thaumatococcus daniellii* which comprises extracting at least a portion of the fruit with a dilute aqueous solution of an aluminum salt.

2. A process according to claim 1, in which the concentration of the aluminum salt solution is not greater than 2% by weight.

3. A process according to claim 2, in which the concentration of the aluminum salt solution is 0.7 to 1% by weight.

4. A process according to claim 1 in which the extraction is effected at a temperature of 4°–40° C.

5. A process according to claim 1 in which the aluminum salt is selected from the group consisting of aluminum sulphate, aluminum alkali metal sulphates, and aluminum ammonium sulphates.

6. A process according to claim 1, in which whole fruit or isolated arils are extracted.

7. A process according to claim 1 in which the extract is purified by ion exchange using a cationic ion-exchange medium.

8. A process according to claim 7 in which the medium is selected from the group consisting of carboxylic resins and celluloses and sulphonic resins and celluloses.

9. A process according to claim 8, in which the medium is a carboxymethylcellulose.

10. A process according to claim 8, in which the medium is a sulphonic acid cross-linked dextran.

11. A process according to claim 8, in which the medium is used in the form of a salt with an alkali metal or ammonia.

12. A process according to claim 7, in which colour and then sweetener are eluted using an aqueous solution of an acid salt of an alkali metal or ammonium.

13. A process according to claim 12, in which the acid is selected from the group consisting of $\alpha$-hydroxy mono-, di- and tricarboxylic acids.

14. A process according to claim 13, in which colour is eluted using a lactate.

15. A process according to claim 13, in which sweetener is eluted using a citrate.

16. A process according to claim 15, in which trisodium citrate is used.

17. A process according to claim 12, in which colour is eluted using a 0.01 to 0.05 M solution of the salt.

18. A process according to claim 12, in which sweetener is eluted using a 0.025 to 0.05 M solution of the salt.

19. A process according to claim 7, in which the eluate is adjusted to pH 3 to 4.5 and ultra-filtered.

20. The aluminum adduct of thaumatin obtained by contacting thaumatin with aluminum ions.

21. The aluminum adduct of thaumatin according to claim 20, obtained by a process which comprises extracting at least a portion of the fruit of *Thaumatococcus daniellii* with a dilute aqueous solution of an aluminum salt.

22. The aluminum adduct of thamuatin according to claim 20, obtained by dialysing an aqueous extract containing thaumatin against an aluminum salt solution.

* * * * *